W. A. PATTERSON.
COTTON GATHERER.
APPLICATION FILED JULY 28, 1910.
999,395.
Patented Aug. 1, 1911.
2 SHEETS—SHEET 1.
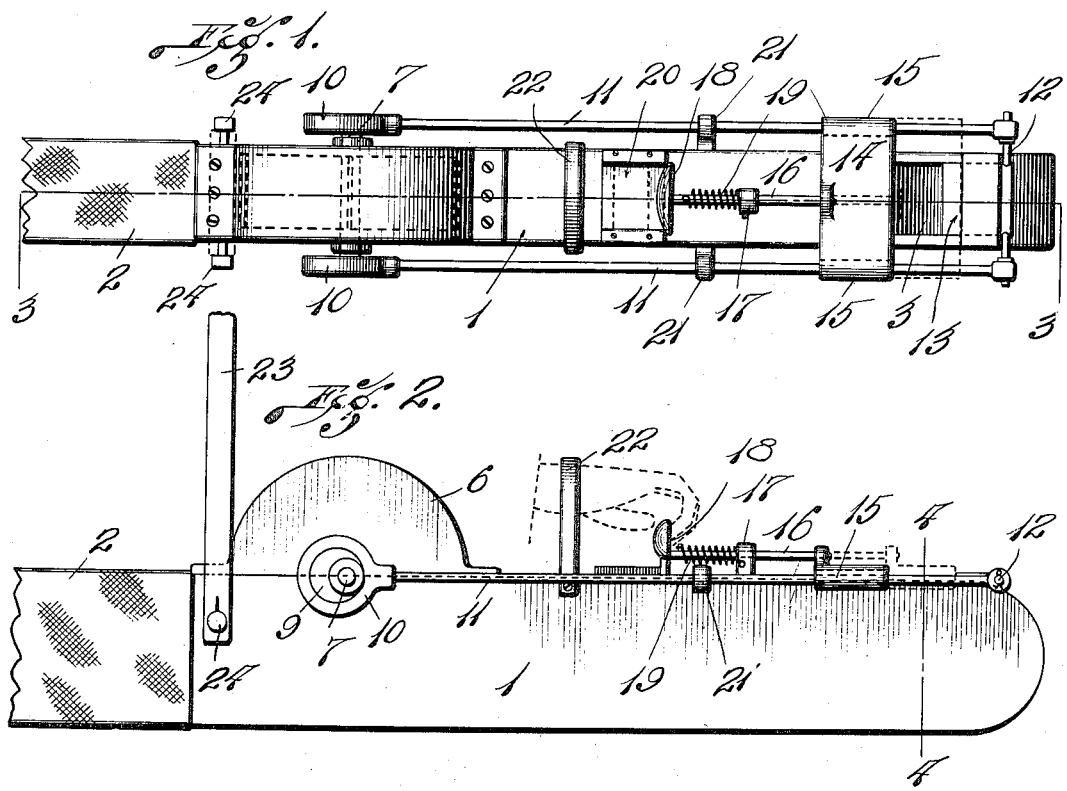
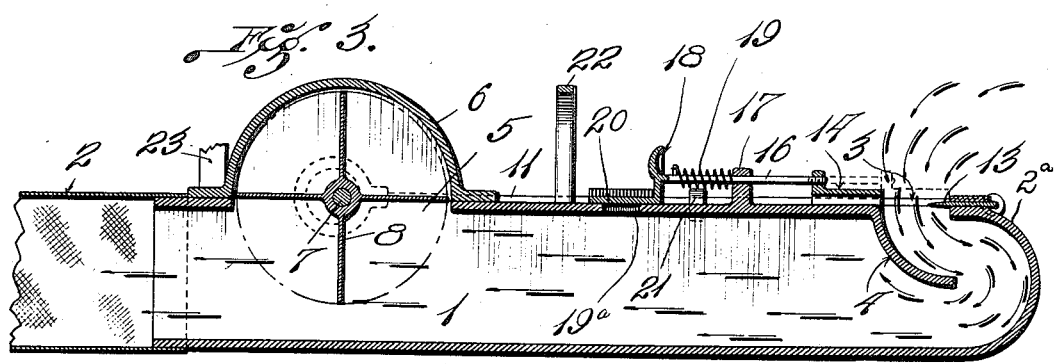
WITNESSES.
E. M. Harrington.
Wm. Jarvis.
INVENTOR.
W. A. PATTERSON.
BY J. R. Cornwell. Atty.

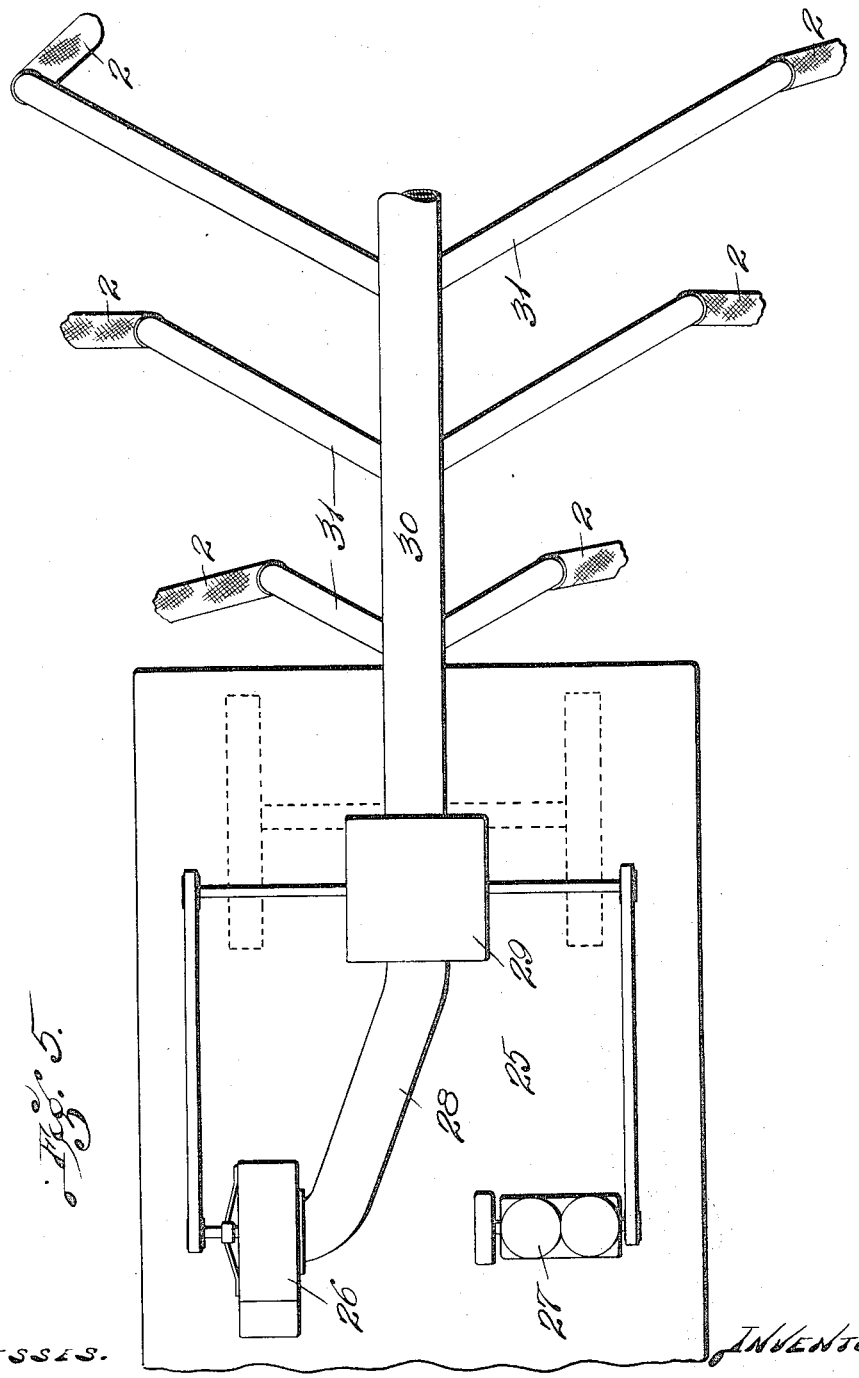

UNITED STATES PATENT OFFICE.

WARREN A. PATTERSON, OF ST. LOUIS, MISSOURI.

COTTON-GATHERER.

999,395.   Specification of Letters Patent.   Patented Aug. 1, 1911.

Application filed July 28, 1910. Serial No. 574,310.

*To all whom it may concern:*

Be it known that I, WARREN A. PATTERSON, a citizen of the United States, residing at St. Louis, Missouri, have invented a certain new and useful Improvement in Cotton-Gatherers, of which the following is a full, clear, and exact description, such as will enable others skilled in the art to which it appertains to make and use the same, reference being had to the accompanying drawings, forming part of this specification, in which—

Figure 1 is a plan view of my improved cotton gatherer. Fig. 2 is a side elevation of the gathering machine. Fig. 3 is a section taken on the line 3—3 of Fig. 1. Fig. 4 is a cross section taken on the line 4—4 of Fig. 2. Fig. 5 is a plan view of a vehicle provided with a suction-producing apparatus and with a series of suction tubes to which my improved gathering devices are connected.

My invention relates to a machine or apparatus for gathering cotton, the object of my invention being to provide a simple apparatus which is carried upon the arm of the operator and which cuts the bolls from the stalks, said bolls being drawn into and through the gathering apparatus by suction produced by suitable mechanism arranged on a vehicle which traverses the cotton field.

In the majority of cotton gatherers heretofore devised and utilizing suction, the cotton has been drawn from the boll, but in my improved gathering apparatus, it is the intention to gather the entire boll, the cotton being separated from the shell by suitable machinery.

To the above purposes, my invention consists in certain novel features and arrangement of parts hereinafter more fully described and claimed.

Referring by numerals to the accompanying drawings, 1 designates an elongated tubular housing, one end of which is connected to a flexible tube 2. The opposite end of this tube is closed as designated by 2ª and formed through one of the walls adjacent said closed end is an opening 3. Formed on or fixed to the wall of the tube adjacent this opening 3 is an inwardly projecting curved deflector 4.

Formed in the tube 1, adjacent the end connected to the flexible tube 2, is an opening 5, and arranged over said opening and fixed to the tube 1 is a semi-circular housing 6. Journaled for rotation in the side walls of the tube 1 at the center of the opening 5 is a shaft 7, and mounted thereon within the housing 6 is a fan 8. Carried by the ends of the shaft 7, which project beyond the sides of the tube 1, are eccentric disks 9, and encircling said disks are straps 10. Connected to the straps 10 are the rear ends of rods 11, which extend along the sides of the tube 1, and the forward ends of said rods are connected to a transversely disposed rod 12, to which is connected a plate 13, which latter is arranged to slide forward and backward in suitable guides immediately over the opening 3. The edge of this plate 13, which moves across the opening 3, is sharpened to form a knife edge which is utilized in cutting the bolls from the stalks.

14 designates a plate which is arranged to slide forward and backward over the opening 3, and the sides of said plate 14 are provided with bearings 15, through which the rods 11 are mounted to operate. The plate 14 occupies and reciprocates in a plane immediately above the plane occupied by the reciprocating knife 13, and thus there is no interference of the two parts when the plate moves forward to close the opening 3. Connected to the plate 14 is a rearwardly extending rod 16 which is mounted to slide through a bearing 17 formed on the shaft of the tube 1, and the rear end of this rod 16 is provided with a handle 18.

19 designates a retractile coil spring which is located on the rod 16 between the bearing 17 and the handle 18, said spring normally tending to maintain the plate 14 in position over the opening 3.

Formed in the top of the tube 1, below the handle 18, is an opening 19ª, and arranged to slide in suitable bearings on top of the tube is a plate 20 which is connected to and moves with the handle 18 and rod 16. When the plate 14 is in its normal position over the opening 3, the plate 20 is moved forward to such a position as to expose the opening 19ª, and when the parts are so positioned, air will be drawn into the tube 1 through said opening 19ª.

21 designates bearings for the central portions of the rods 11, said bearings being formed on or fixed to the sides of the tube 1.

22 designates a loop which is fixed to and extends upward from the tube 1 between the housing 6 and handle 18, and when the apparatus is in use, the arm of the operator passes through this loop 22. The ends of a strap 23, shown, are detachably connected to pins 24 on the rear end of the tube 1, which strap passes over the shoulder of the operator, thus supporting the greater portion of the weight of the gathering apparatus.

It is the intention to use my improved cotton gatherer in connection with a vehicle adapted to traverse the cotton field, and which vehicle is equipped with a suitable suction-producing apparatus having a series of tubes and to which tubes the flexible tubes 2 are connected.

Referring to Fig. 5, 25 designates the body or bed of the vehicle, and located thereon is a suction fan 26 operated by a motor 27, preferably in the form of an internal combustion engine, and located adjacent said fan and connected thereto by a tube 28 is a vacuum box 29. Leading from this vacuum box is a main suction tube 30, from which lead branch suction tubes 31, and connected to said branch tubes are flexible tubes 2, carrying at their outer ends the tubular gathering devices hereinbefore described.

When my improved apparatus is in operation, the fan 26 creates a partial vacuum in the vacuum box 29, and consequently creates suction through the tubes 30 and 31. The operators carrying the tubes 1 traverse the cotton field at the sides and to the rear of the vehicle. Normally, the plate 14 covers the opening 3, and the opening 19ª is open to permit air to be drawn into the tube 1 by the suction produced in the tubes 30 and 31. The suction of air through the tube 1 imparts rearward motion to the fan 8, and the eccentric disks 9 operating in the straps 10 impart reciprocating motion to the connecting rods 11, and this motion is imparted to the plate 13 provided with the knife edge.

To gather a cotton boll, the operator manually engages the handle 18 and pulls the same rearward, which movement draws the plate 14 rearward, thus uncovering the opening 3 and simultaneously sliding the plate 20 over the opening 19ª. The suction of air now enters the tube 1 through the opening 3, and the gatherer is manipulated so that the boll of cotton is drawn into the opening 3. With the next movement of the plate 13 across said opening 3, the boll will be cut from the stem, and said boll will be drawn through the tube 1, from thence to the flexible tube 2 into and through the corresponding tube 3, thence through the tube 30 into the vacuum box 29, and will drop from said vacuum box into a suitable receptacle. The deflector 4, located immediately in front of the opening 3, serves as a support for the boll of cotton when the same is drawn into the tube and during the time the knife is cutting the boll from the stem. This deflector plate is purposely curved forward so as to force the stem carrying the boll of cotton against the cutting edge of the reciprocating knife. The flexible tube 2 permits the gathering devices to be readily shifted in any direction, and this freedom of movement permits the operator to readily gather all of the ripe bolls on the cotton stalks. By gathering the entire boll, that is, the shell and the cotton fiber, I am able to obtain all of the fiber from the boll, and this result can not be obtained where the cotton fiber is drawn from the shell by suction, as is the case in a large number of pneumatic cotton-gathering machines.

It will be noted that the opening 3 is formed through the top of the tube 1, and by such arrangement dirt, sand the like, is prevented from being drawn into the tube when the forward end thereof is in a position close to the ground. Any cotton bolls which may lie upon the ground must be lifted a short distance before they are drawn through the opening into the tube by suction.

It will be noted that the plate 13 having the knife edge is reciprocated by means of the fan 8 located in the rear end of the tube 1. This fan is driven or actuated by the natural draft or suction through the tube 1, and thus the knife edge plate is driven without the requirement of a separate operating means such as a motor or a mechanical driving connection from the engine on the vehicle.

My improved gathering apparatus is comparatively simple, can be readily carried and handled by an operator, and requires no operation other than the manipulation of the handle 18 to uncover the inlet opening in the tube.

It will be readily understood that minor changes in the construction and arrangement of the various parts of my device can be made and substituted for those herein shown and described without departing from the nature and spirit of my invention.

I claim:

1. In a cotton gathering apparatus the combination with a suction tube, of a tube having a suction opening formed through one of its walls, and a reciprocating knife guided to move across said suction opening and operated by the suction through the tube.

2. In a cotton gathering apparatus, the combination with a suction tube, of a tube connected to said suction tube, said tube having a suction opening formed in one of the walls thereof, and a reciprocating knife-edged plate guided to move across the opening, which plate is operated by the suction through the tube, and a deflector within the tube opposite the opening.

3. The combination with a suction tube, of a tube provided with a suction opening, a reciprocating knife edged plate guided to move across the opening, and means operated by the suction through the tubes for imparting movement to the knife edged plate.

4. In a cotton gathering device, a tube, having an inlet opening formed in one wall thereof, a deflector within the tube adjacent the opening, a knife guided to move across the opening, and a sliding plate for normally closing said opening.

5. In a cotton gathering apparatus, the combination with a suction tube, of a tube connected to the suction tube, in which tube is formed an inlet opening, a knife guided to move across said inlet opening, means operated by the suction through the tubes for imparting movement to the knife, and a sliding plate normally closing the inlet opening.

6. The combination with a suction tube, of a tube in which is formed a pair of inlet openings, a knife guided to move across one of said inlet openings, means operated by suction through the tubes for imparting movement to the knife, and means for alternately closing said inlet openings.

7. The combination with a suction tube, of a tube in which is formed an inlet opening, a reciprocating knife guided to move across said opening, and operated by the suction of air through the tubes and a yielding member guided to move toward the edge of the knife, and to close said inlet opening.

8. The combination with a suction tube, of a tube in which is formed an inlet opening, a knife guided to move across the opening, means operated by the suction through the tubes for moving the knife, a plate guided to slide on the tube over the knife, and to close the inlet opening, and a handle connected to said plate.

9. In a cotton gathering apparatus, a tube having an opening formed adjacent one end, a deflector on the interior of the tube opposite the opening in the top thereof, a cutter on the tube, guided to move across the opening therein, and a yielding member guided to slide on the tube and to move toward the edge of the cutter.

In testimony whereof I hereunto affix my signature in the presence of two witnesses, this 25th day of July, 1910.

WARREN A. PATTERSON.

Witnesses:
M. P. SMITH,
ALMA GEBHART.